United States Patent [19]

Harder, Jr.

[11] 4,023,860
[45] May 17, 1977

[54] SEAT BACK WITH LIMITED ACCESS TO THE REAR THEREOF

[75] Inventor: Arthur J. Harder, Jr., Franklin Park, Ill.

[73] Assignee: Coach & Car Equipment Corporation, Elk Grove Village, Ill.

[22] Filed: July 26, 1976

[21] Appl. No.: 708,482

[52] U.S. Cl. .............................. 297/283; 297/219; 297/444; 297/452
[51] Int. Cl.² ........................................ A47C 27/00
[58] Field of Search .......... 297/218, 219, 283, 444, 297/452, 440, 454, 455

[56] References Cited
UNITED STATES PATENTS

| | | | |
|---|---|---|---|
| 2,960,152 | 11/1960 | Wendell | 297/455 X |
| 3,848,925 | 11/1974 | Harder | 297/452 |
| 3,948,557 | 4/1976 | Barecki | 297/283 |

Primary Examiner—James C. Mitchell
Attorney, Agent, or Firm—Merriam, Marshall, Shapiro & Klose

[57] ABSTRACT

A seat back for the corner seat in the last row of seats in a mass transit bus where access to the rear of the seat back is extremely limited. The seat back comprises a shell portion and a removable pad portion carrying fasteners which extend rearwardly through openings in the shell portion. A pair of fasteners are engaged by a locking member, at the rear of the shell portion, which is slidably movable between unlocking, partially locking and totally locking positions. A latch is engageable with the locking member to hold the latter in its totally locking position.

11 Claims, 9 Drawing Figures

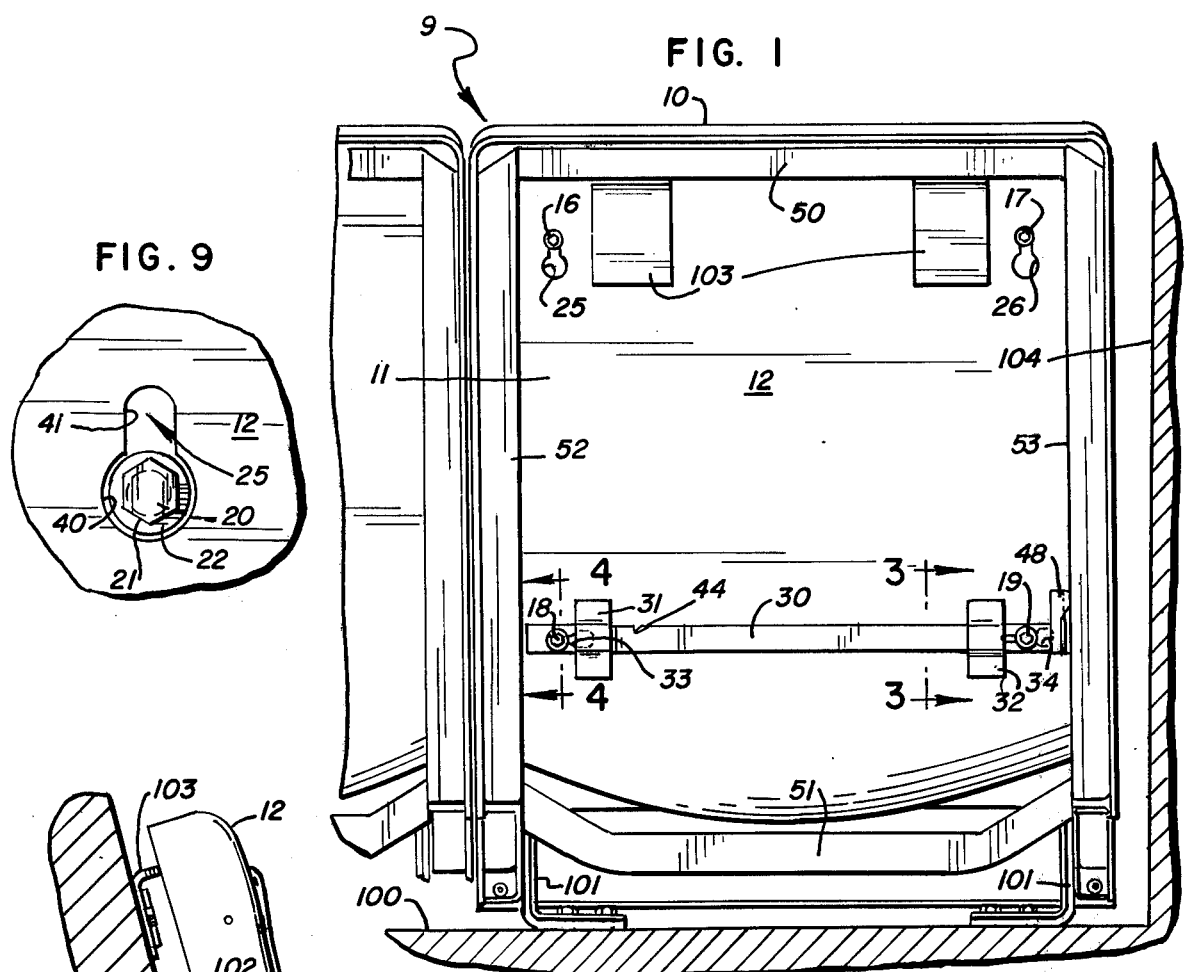
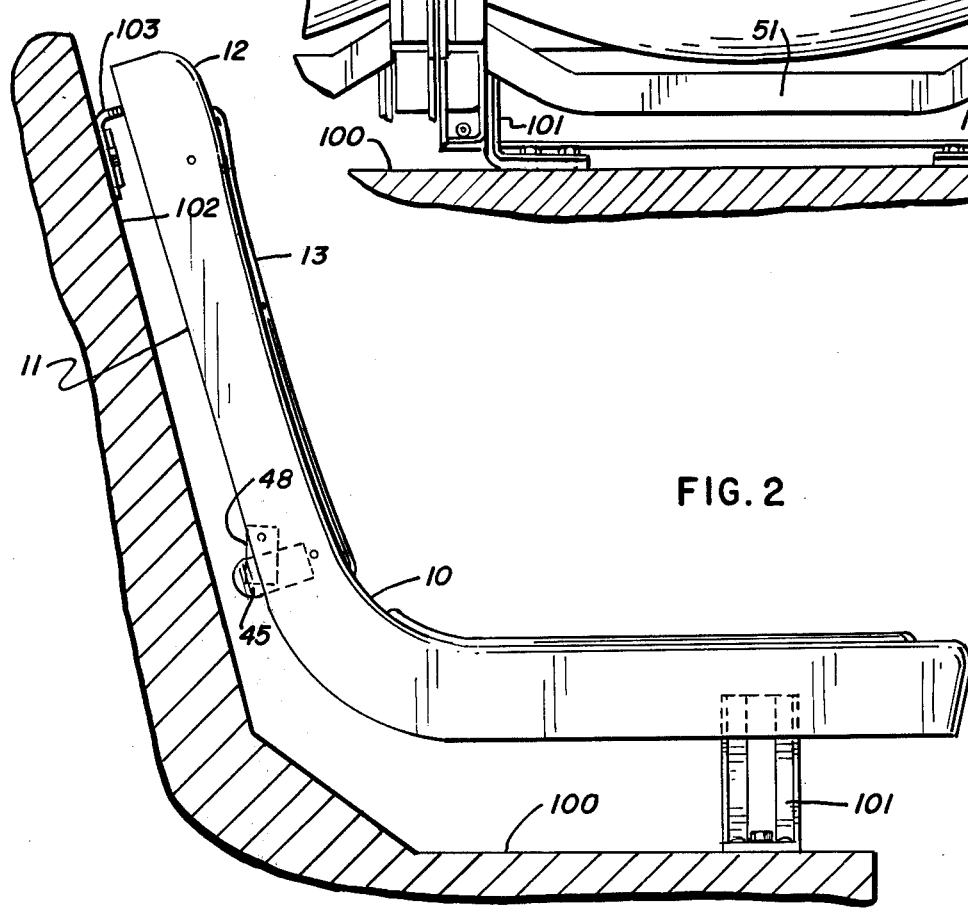

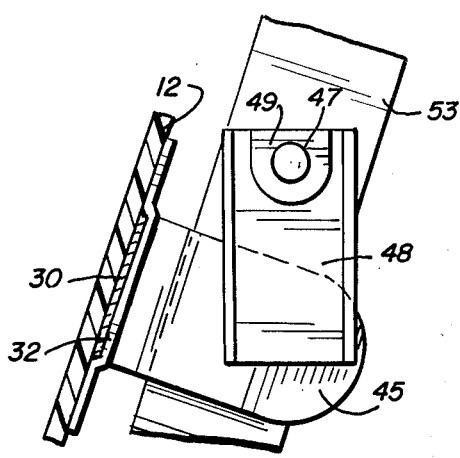
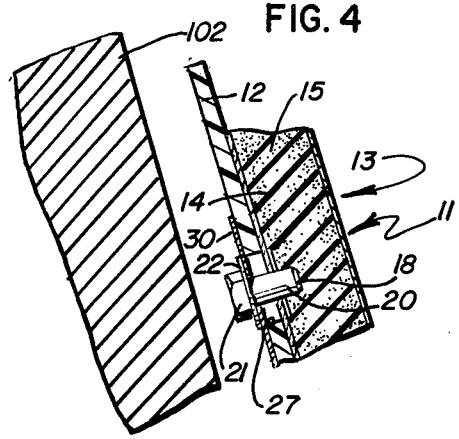
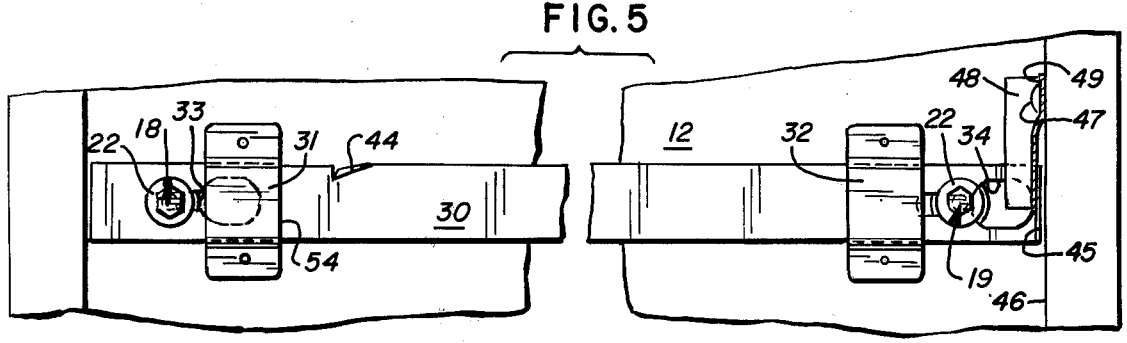
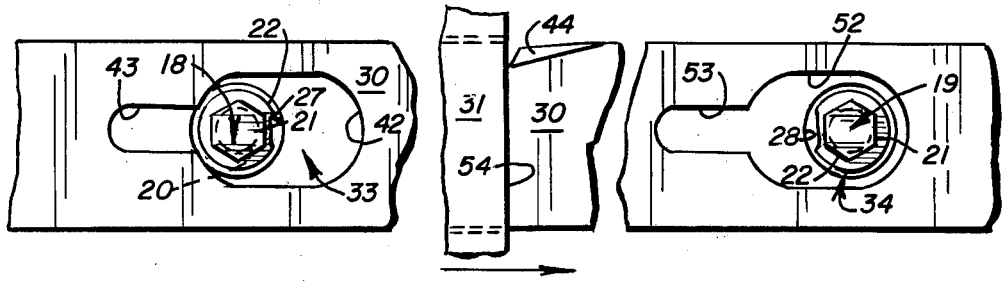
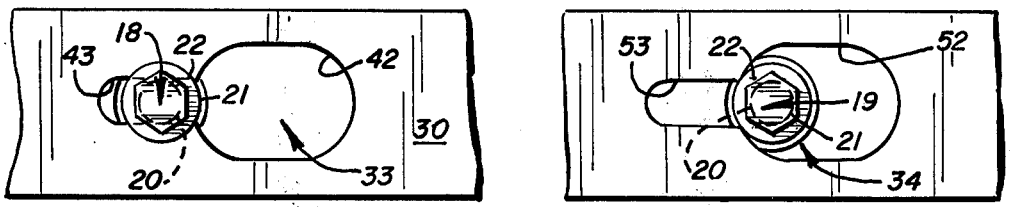
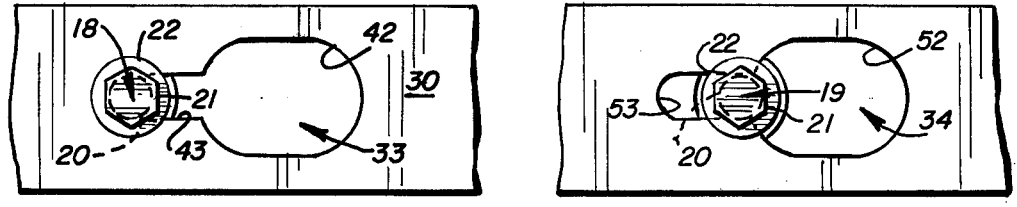

SEAT BACK WITH LIMITED ACCESS TO THE REAR THEREOF

BACKGROUND OF THE INVENTION

The present invention relates generally to seats for mass transit vehicles such as buses, and more particularly to seats of this type located at the back wall of the bus where access to the rear of the seat back is extremely limited.

In a typical mass transit bus, the last row of seats in the bus generally consists of five seats extending abreast from one side of the bus to the other. The backs of these five seats are usually located so close to the back wall of the bus that access to the rear of a seat back is extremely limited. Typically, the distance between the rear of the seat back and the back wall of the bus is only about 1½ inches or so.

A seat back typically comprises a rigid shell portion and a removable pad portion mounted on the front of the shell portion. It is desirable that the pad portion be mounted on the shell portion with fasteners which are not readily accessible from the front of the seat, to reduce pilferage of the pad portion. To so mount a pad portion requires that there be access to the rear of the seat back. In the last row of the bus, the three middle seats may have seat cushions which are tiltable upwardly together, thereby providing access to the rear of the seat back, from below. However, for the safety of maintenance personnel or other reasons, it is undesirable for the two corner seats in the last row to be tiltable.

With respect to a corner seat, although there may be room between the outer side of the seat and the adjacent side wall of the bus for a hand to reach around from in front to a portion of the rear of the seat back, that portion of the seat back rear surface to which the hand has such access is relatively limited, comprising a narrow area adjacent the side wall of the bus. The hand cannot reach areas adjacent all four corners of the rear of the seat back, yet it is desirable to provide fasteners at these four locations.

SUMMARY OF THE INVENTION

In accordance with the present invention, there is provided a seat back for the corner seat of the last row of a mass transit bus. The seat back has a removable pad portion which can be easily mounted or removed by one person manipulating mounting structure on whose operation he has been instructed. The seat is relatively pilferage proof, all the fasteners and mounting structure being located behind the seat where the fasteners are inaccessible and the mounting structure is not visible so that the manipulation thereof required to remove a pad portion cannot be determined by an uninstructed potential thief examining the seat back from the front.

No special tools are required to mount or remove the pad portion, and the entire mounting operation is accomplished from the front of the seat. The person mounting or removing the pad portion need have access, with his hand, to only one small area of the seat back rear surface, adjacent the side wall of the bus, yet the pad portion is attached with fasteners adjacent all four corners of the seat back.

Other features and advantages are inherent in the structure claimed or disclosed or will become apparent to those skilled in the art from the following detailed description in conjunction with the accompanying diagrammatic drawing.

BRIEF DESCRIPTION OF THE DRAWING

FIG. 1 is a rear view of a seat having a back constructed in accordance with an embodiment of the present invention;

FIG. 2 is a side view of the seat of FIG. 1;

FIG. 3 is an enlarged, fragmentary sectional view taken along line 3—3 in FIG. 1;

FIG. 4 is an enlarged, fragmentary sectional view taken along line 4—4 in FIG. 1;

FIG. 5 is an enlarged, fragmentary rear view of a lower portion of the seat back;

FIGS. 6–8 are enlarged, fragmentary rear views of the lower portion of the seat back showing a locking member for the seat back in three different positions thereof; and FIG. 9 is an enlarged, fragmentary rear view of an upper portion of the seat back.

DETAILED DESCRIPTION

Referring initially to FIGS. 1 and 2, indicated generally at 9 is the back row of seats in a mass transit bus. Row 9 includes a corner seat 10 mounted by brackets 101 on the floor 100 of a bus having a back wall 102 (FIG. 2) and a side wall 104 (FIG. 1). Seat 10 has a tubular frame including top and bottom members 50, 51 and side members 52, 53. Depending from top frame member 50 are brackets 103 for mounting seat 10 on back wall 102 of the bus.

Seat 10 includes a seat back 11 comprising a rigid, substantially vertically disposed shell portion 12 and a removable pad portion 13 located on the front of shell portion 12. Pad portion 13 comprises a metal base 14 and a cushion 15 (FIG. 4).

Carried on pad portion 13, at metal base 14, are four fasteners 16–19, consisting of a pair of horizontally spaced top fasteners 16, 17 and a pair of horizontally spaced bottom fasteners 18, 19. Each fastener extends in an axial direction rearwardly from pad portion 13, and each comprises a shank portion 20 and a head portion 21 including a collar 22 (FIGS. 4 and 9).

Shell portion 12 has a pair of horizontally spaced top openings 25, 26 and a pair of horizontally spaced bottom openings 27, 28 (FIG. 6). Each of the openings 25–28 comprises means for receiving a respective one of said fasteners 16–19.

Located on the rear surface of shell 12, alongside the lower pair of horizontally spaced openings 27, 28 is a locking member 30 (FIGS. 1 and 5). A pair of elements 31, 32 mount locking member 30 for sliding movement in a horizontal direction between a plurality of positions to be described subsequently.

Locking member 30 comprises a pair of horizontally spaced slots 33, 34 for receiving therethrough a respective bottom fastener 18, 19 in a manner to be described subsequently.

Referring to FIG. 9, each of the top pair of openings 25, 26 includes a large circular portion 40 and a small slotted portion 41 extending vertically from large portion 40. The dimensions of fastener head portion 21 and its collar 22, transverse to the axis of the fastener, are larger than the corresponding transverse dimension (e.g., diameter) of fastener shank portion 20. Referring to openings 25, 26 the width or diameter of large portion 40 thereof is sufficiently large to receive therethrough head ortion 21, collar 22 and shank portion 20 of a fastener. The width of smaller, slotted portion 41 is too small to receive therethrough head portion 21 or collar 22 of the fastener, but slotted portion 41 is large enough to receive and embrace fastener shank portion 20.

To assemble pad portion 13 on shell portion 12, from the front of seat 10, head portion 21 and collar 22 of fasteners 16, 17 are inserted through large portions 40 of openings 25, 26 respectively, following which pad portion 13 is raised upwardly so that shank portions 20 of fasteners 16, 17 are moved into and embraced by the smaller slotted portions 41 of openings 16, 17. Because the width of slotted portion 41 is smaller than the diameter or transverse dimension of head portion 21 or its collar 22, the area around slotted opening portions 41 hold fasteners 16, 17 against forward axial movement once shank portions 20 are embraced by slotted portions 41.

When pad portion 13 has been raised so that shank portions 20 of upper fasteners 16, 17 are embraced by slotted opening portions 41, the lower pair of fasteners 18, 19 are in registry with the lower pair of openings 27, 28 (FIG. 6). Lower openings 27, 28 are each circular (FIG. 6) and have a width or cross sectional dimension (e.g., diameter) sufficiently large to receive therethrough head portion 21 and collar 22 of lower fasteners 18, 19.

Referring now to FIGS. 5–8, each slot 33, 34 on locking member 30 comprises a respective first portion 42, 52, sufficiently large to permit fastener head portion 21 and collar 22 to fit therethrough, and a respective second portion 43, 53, sufficiently small to prevent head portion 21 and collar 22 from passing therethrough but sufficiently large to receive and embrace shank portion 20 of that fastener.

Locking member 30 is mounted for slidable movement in a horizontal direction between three positions illustrated in FIGS. 6, 7 and 8 respectively.

When locking member 30 is in its first or unlocking position, illustrated in FIG. 6, the first slot portion 42, 52 of each slot 33, 34 is in registry with a respective fastener 18, 19. With locking member 30 in its first position, neither fastener 18 nor 19 is locked by the locking member, and both are free to be withdrawn from a position extending through their respective slots 33, 34.

Fasteners 18, 19 are locked on shell portion 12 in two steps. The first step involves pushing fastener 18 through first slot portion 42 of slot 33 and then sliding locking member 30 from the first position shown in FIG. 6 to the second or partial locking position shown in FIG. 7. When member 30 is in this position, second slot portion 43 of slot 33 is in registry with fastener 18 while the first slot portion 52 of slot 34 is still in registry with fastener 19. In this position of member 30, fastener 18 is locked against forward axial movement but fastener 19 is not. More specifically, shank portion 20 of fastener 18 is embraced by second slot portion 43, and collar 21 engages against that portion of locking member 30 surrounding second slot portion 43 which blocks forward axial movement of fastener 18.

In shell portion 12, the lower pair of openings 27, 28 are at a height registrable with the knee of a person, such as a seat assembler, at the front of the seat. Therefore, the act of pushing fastener 18 through first slot portion 42, prior to moving locking member 30 from its first to its second positions, is preferably accomplished by the assembler pressing with his knee against the front of pad portion 13, opposite fastener 18. At the same time, the assembler uses his two hands to hold pad portion 13 in its raised position, with fasteners 16, 17 in slotted portions 41 of openings 25, 26, to maintain fasteners 18, 19 in registry with openings 27, 28 and slots 33, 34.

After fastener 18 has been locked, as shown in FIG. 7, the assembler presses with his knee against the front of padded portion 13 opposite fastener 19 to push the head portion and collar of fastener 19 all the way through first portion 52 of slot 34, following which he slides locking member 30 from the second position shown in FIG. 7 to the third or fully locking position shown in FIG. 8. In the third position of locking member 30, second slot portion 53 of slot 34 is in registry with fastener 19 and embraces shank portion 20 thereof. Also, collar 21 on fastener 19 is engaged by those portions of locking member 30 surrounding second slot portion 53, thereby preventing forward axial movement of fastener 19 and locking that fastener in place.

Referring again to FIG. 6, locking member 30 includes a projection or stop portion 44 which engages an edge 54 of mounting element 31 when the locking member is in its first position to hold the locking member in that position and prevent further movement of the locking member away from its second and third positions (i.e., to the left as viewed in FIG. 6). This maintains the registry of locking member slots 33, 34 with fasteners 18, 19 when the latter are inserted through the lower pair of openings 27, 28 in shell portion 12.

Locking member 30 is held in its third position, wherein it locks both fasteners 18, 19, by latching structure now to be described, with reference to FIGS. 1–3 and 5.

Located at that end of locking member 30 adjacent bus side wall 104 is a handle 45 extending rearwardly from member 30. Mounted on the seat's side frame member 53, adjacent bus side wall 104 is a latch 48. Latch 48 is mounted for pivotal movement about the axis of a pin or rivet 47 extending through a recessed portion 49 of latch 48. The latch is movable between a first position (illustrated in FIG. 3) for engaging handle 45 on locking member 30, when the latter is in its third position (FIG. 8), and a second, non-engaging position, not shown in the drawing but which would be pivotally displaced in a counterclockwise sense as viewed in FIG. 3. Latch 48 is normally urged by gravity to its first, engaging position shown in FIG. 3. Except for its recessed portion 49, latch 48 is spaced from side frame member 53 a slight amount to accommodate handle 45 between latch 48 and side frame member 53.

Handle 45 is readily accessible to the hand of a person reaching around from the front of seat back 11 when locking member 30 is in any one of its three positions.

In summary, pad portion 13 of the seat back may be readily mounted on the shell portion 12 and locked in place and may be readily unlocked and removed by a person who is familiar with the mounting structure. On the other hand, the pad portion is relatively pilferage proof because the mounting structure, especially locking member 30, handle 45 and the latching structure 47–48, are not visible to a potential thief in front of the seat. The potential thief thus cannot become familiar with the structure he must manipulate to pilfer the pad portion of the seat back, thus foiling his efforts at pilferage.

The foregoing detailed description has been given for clearness of understanding only, and no unnecessary limitations should be understood therefrom, as modifications will be obvious to those skilled in the art.

What is claimed is:

1. A seat back comprising:
   a substantially vertically disposed shell portion;
   a removable portion located on the front of said shell portion;
   first and second horizontally spaced fastener means on said removable portion, each of said fastener means extending in an axial direction rearwardly from said removable portion;
   each of said fastener means comprising a shank portion and a head portion, said head portion being located rearwardly of said shank portion and having a larger dimension than said shank portion transverse to the axis of said fastener;
   said shell portion having a pair of horizontally spaced openings each comprising means for receiving a respective one of said first and second fastener means therethrough;
   a horizontally disposed locking member located on the back of said shell portion;
   means mounting said locking member for sliding movement in a horizontal direction between first, second and third positions thereof;
   first and second slot means on said locking member;
   means on said first slot means for receiving therethrough the head portion of said first fastener means when said locking member is in said first position;
   means on said first slot means for embracing the shank portion of said first fastener means and for holding said first fastener means against forward axial movement, when the locking member is in its second and third positions;
   means on said second slot means for receiving therethrough the head portion of said second fastener means when said locking member is in its first and second positions;
   and means on said second slot means for embracing the shank portion of said second fastener means and for holding said second fastener means against forward axial movement, when the locking member is in its third position.

2. A seat back as recited in claim 1 and comprising:
   stop means for limiting movement of said locking member in a direction away from its second and third positions when the locking member is in its first position.

3. A seat back as recited in claim 1 and comprising:
   latch means for holding said locking member in its third position.

4. A seat back as recited in claim 1 and comprising:
   handle means, at one end of said locking member, accessible to the hand of a person reaching around from the front of said seat back when said locking member is in any one of said three positions.

5. A seat back as recited in claim 4 and comprising:
   a latch member;
   means mounting said latch member for movement between (1) a first position for engaging said handle of the locking member when the latter is in its third position and (2) a second, non-engaging position; and
   means normally urging said latch member to its first position.

6. A seat back as recited in claim 5 and comprising:
   a side member adjacent one side of said shell portion;
   said latch member being mounted on said side member at a location accessible to the hand of a person reaching around from the front of said seat back.

7. A seat back as recited in claim 1 wherein each of said slot means comprises:
   a first portion sufficiently large to permit the head portion of a fastener means to fit therethrough; and
   a second portion sufficiently small to prevent said head portion from passing therethrough.

8. A seat back as recited in claim 7 wherein:
   said first portion of said first slot means is in registry with said first fastener means when the locking member is in its first position;
   said second portion of said first slot means is in registry with said first fastener means when the locking member is in its second and third positions;
   said first portion of said second slot means is in registry with said second fastener means when the locking member is in its first and second positions; and
   said second portion of the second slot means is in registry with said second fastener means when the locking member is in its third position.

9. A seat back as recited in claim 1 and comprising:
   third and fourth horizontally spaced fastener means on said removable portion, each of said third and fourth fastener means being vertically spaced from said first and second fastener means and each extending in an axial direction rearwardly from said removable portion;
   each of said third and fourth fastener means comprising a shank portion and a head portion, said head portion being located rearwardly of said shank portion and having a larger dimension than said shank portion transverse to the axis of said fastener;
   said shell portion having a second pair of horizontally spaced openings, vertically spaced from said first-recited pair of openings in the shell portion;
   each of said second pair of openings comprising a large portion for receiving therethrough the head portion of a respective one of said third and fourth fastener means;
   each of said second pair of openings comprising a small portion, vertically aligned with said large portion of said opening, for embracing the shank portion of a respective one of said third and fourth fastener means and for holding said fastener means against forward axial movement;
   said first and second fastener means being in registry with said first-recited pair of openings in the shell portion when the shank portions of said third and fourth fastener means are embraced by the small portions of said second pair of openings.

10. A seat back as recited in claim 9 wherein:
    said first recited pair of openings in the shell portion is located below said second pair of openings therein;
    said first pair of openings being at a height registrable with the knee of a person located to the front of said seat back.

11. A seat back as recited in claim 10 wherein:
    the small portion of each of said second pair of openings is located above said large portion of the opening.

* * * * *